June 11, 1940. G. CARWARDINE 2,204,301
ELASTIC FORCE AND EQUIPOISING MECHANISM
Filed Jan. 21, 1938 7 Sheets-Sheet 1

INVENTOR
George Carwardine
BY
ATTORNEYS

June 11, 1940. G. CARWARDINE 2,204,301
ELASTIC FORCE AND EQUIPOISING MECHANISM
Filed Jan. 21, 1938 7 Sheets-Sheet 3

INVENTOR
George Carwardine
BY
ATTORNEYS

June 11, 1940.  G. CARWARDINE  2,204,301
ELASTIC FORCE AND EQUIPOISING MECHANISM
Filed Jan. 21, 1938  7 Sheets-Sheet 4

INVENTOR
George Carwardine
BY
ATTORNEYS

June 11, 1940.                 G. CARWARDINE                 2,204,301
                  ELASTIC FORCE AND EQUIPOISING MECHANISM
                       Filed Jan. 21, 1938          7 Sheets-Sheet 5

INVENTOR
George Carwardine
BY
Blair & Kilgore
ATTORNEYS

June 11, 1940.   G. CARWARDINE   2,204,301
ELASTIC FORCE AND EQUIPOISING MECHANISM
Filed Jan. 21, 1938   7 Sheets-Sheet 6

INVENTOR
George Carwardine
BY
ATTORNEYS

Patented June 11, 1940

2,204,301

UNITED STATES PATENT OFFICE

2,204,301

ELASTIC FORCE AND EQUIPOISING MECHANISM

George Carwardine, Bath, England, assignor of one-half to Herbert Terry & Sons Limited, Redditch, England, a company of Great Britain Application January 21, 1938, Serial No. 186,208
In Great Britain January 26, 1937

12 Claims. (Cl. 248—280)

This invention relates to equipoising mechanisms, that is mechanisms in which a mass, such as a lamp, mirror, microphone, search-light or X-ray apparatus, is connected to but is movable relatively to a support and is arranged to remain in equilibrium in all positions within its range of movement. The necessary balancing forces are often supplied by weights, but weights are clumsy, and equipoising mechanisms have been designed in which the balancing forces are supplied by springs. The present invention is concerned with equipoising mechanisms in which springs are used.

A lever carrying a weight at one end and pivoted about a horizontal axis to a support can be balanced in all positions about that axis independently of friction if a spring is applied to the lever and is arranged so that it exerts a force that varies directly as the distance between the two points between which it acts the rate of the spring and the positions of the two points being, of course, appropriately chosen. In the specifications of United States Patents Nos. 2,076,446 and 2,090,439, equipoising mechanisms are described in which use is made of this principle. These mechanisms are, however, all of such a nature that the points, at which the springs act upon their respective levers, always remain at fixed distances from the pivotal axes of the levers. There are further forms of equipoising mechanism in which the balancing forces for pivoted levers, which may be constituted by linkage systems, cannot be arranged to act at fixed distances from the axes of the levers.

Thus, with these facts in mind, one object of the present invention is to enable such further forms of equipoising mechanism to be balanced entirely by means of springs, and, if desired to be balanced accurately throughout a wide range of movement entirely independently of friction. Thus, according to the present invention, an equipoising mechanism is furnished with a collapsible linkage, carrying at one point the mass to be balanced and connected at another point to a support, and with a spring which is connected so as to act between the support and the linkage and which, while opposing the gravitational pull on the mass, tends to cause or allow the distance between the said two points to change, a second spring being connected to act between two points on the linkage so as to counteract this tendency, and the two springs being arranged in relation to the other parts of the mechanism so that the mass remains in equilibrium in all positions within its range of movement. It is to be understood that each spring may consist of any elastic member which has the desired effect, and in fact, the term "spring" is intended to include the case where two or more springs or other elastic members are arranged to act in parallel between a common pair of points. In a modification of the invention, one or each of the two springs is replaced by a set comprising two or more springs, each acting between a different pair of points.

If mechanism in accordance with the invention is required to remain in equilibrium in all positions substantially unaided by friction at the various joints in the mechanism, each spring must be arranged so that it exerts a force which varies substantially directly as the distance between the two points between which it acts. The word "substantially" is used because there must always be a little friction at the joints which will obliterate slight deviations from the ideal spring arrangement for frictionless working. This spring action can be obtained by means of suitably disposed springs of the ordinary kind which has the characteristic of exerting a force proportional to the extension. However, it is usually more convenient to make use of a somewhat less common type of spring which is such that the force varies substantially in direct proportion to its total length.

The linkage is pivoted to the support and is balanced as a whole about the pivotal axis by the first spring or set of springs. Where there is but little friction at the pivotal axis, the first spring or first set of springs must provide a substantially constant vertical component of force counteracting the action of gravity. A component of force passing through the pivotal axis also arises, and this is counteracted by the second spring or second set of springs.

The linkage may conveniently consist of a parallelogram or lazy-tongs linkage so pivoted to a support that the pivotal axis and the centre of gravity of the entire supported mass, including the linkage, always lie on a diagonal of the parallelogram linkage or the longitudinal axis of the lazy-tongs linkage. The longitudinal axis of the lazy-tongs linkage is, of course, the line which always contains the joints that are common to two of the parallelograms or cells in the linkage.

Where the linkage consists of a parallelogram or lazy-tongs linkage, the second spring or second set of springs may be connected between points located on either side of the diagonal or longitudinal axis, the points conveniently being located at opposite joints in the linkage.

Although the linkage may, as indicated above, very advantageously be a pure parallelogram or lazy-tongs linkage, a very simple embodiment of the invention consists of a lever pivoted about a horizontal axis to a support, and a second lever pivoted to the first lever about a further axis. The mass to be balanced is carried by the second lever and the first and second springs are connected respectively between the support and the second lever and between the first and second levers.

In order that the invention may be clearly understood and readily carried into effect, various constructions in accordance therewith will now be described, by way of example, with reference to the accompanying drawings, in which—

Figure 17 is a diagrammatic side elevation of yet another equipoised lamp.

Figures 1, 2:
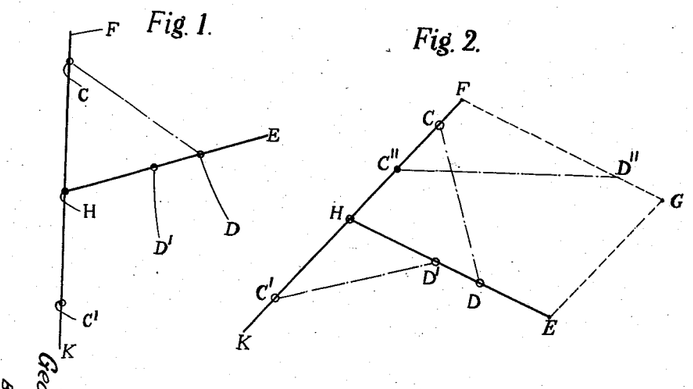
Figure 1 is a diagram serving to illustrate certain underlying principles of the invention.
Figure 2 is a modification of the diagram in Figure 1.

Referring to Figure 1, if FK is a vertical pillar and HE is a lever pivoted to the pillar at H, then a spring CD will balance the weight of a mass applied to the lever HE in any position of the lever about its axis H, provided the spring is so wound that it exerts a force which is directly proportional to the distance between the two points C and D between which it acts, and the rate of the spring is appropriately chosen in relation to the positions of the points C and D on the rod FK and the lever HE. This will be appreciated from the fact that, as CD represents the force exerted by the spring, the triangle CDH represents a triangle of forces in which the vector HC represents a vertical force acting at D and the vector DH represents a force acting at D along the lever EH. For all positions of the lever about its pivot H, the vector HC remains the same, showing that, so far as the balancing of the gravitational pull on the mass is concerned, the spring is equivalent to a constant vertical force acting at D. The principle has been incorporated in certain equipoising mechanisms described in the specifications of my United States Patents Nos. 2,076,446 and 2,090,439.

When the triangle of forces CHD is further considered, it will be appreciated that if the point D is shifted along the lever HE, the vertical force due to the spring remains constant although, as the point of application of this force changes, the turning moment about the axis H varies. If the point C is shifted along the line HF while the position of the point D remains unchanged, the vertical force at D will, of course, be altered.

When the lever HE is not loaded by a weight, it will remain balanced in all positions about its axis, if a further appropriately chosen spring is connected between any point D' on the lever HE and any point C' beneath the point H and located on the pillar KF. This further spring has the characteristic of exerting a force which is directly proportional to the distance between the points C' and D' in all positions of the lever HE about its axis. Considering the triangle of forces, represented by the triangle C'D'H, for this second spring system, it will be seen that the vector HC' represents a vertical force at D' which remains constant throughout the range of movement of the lever HE. Clearly, if the points D and D' coincide and if HC' is equal to HC, the rates of the two springs must be the same to enable the lever HE to be equipoised in all positions. If D and D' coincide and HC is not equal to HC', the condition for equilibrium in all positions is that the ratio of the rates of the two springs shall be equal to the ratio of HC to HC'. When, as shown in Figure 1, the point D' is nearer to the axis H than is the point D, the vertical downward force at D' must be greater than the vertical upward force at D in order that the two turning moments about the axis H may be the same. It will readily be appreciated that this condition will obtain if the two springs are so chosen that the constant ratio between their rates satisfies the following equation:

$$R'(C'H.HD') = R(CH.HD)$$

where R' and R are respectively the rates of the lower and upper springs.

The rate of a spring such as those that are being considered is the constant ratio between the force exerted by the spring when extended to any length and that length. This is because each spring is connected directly at its ends between the two points between which it acts and must therefore always exert a force that is directly proportional to its total length. Such springs can easily be manufactured by winding wire on a mandrel from a bobbin arranged so that the wire, as it passes from the bobbin to the mandrel, is under tension and is at an acute angle with the axis of the helix being wound. In such a spring, the convolutions of the helix press tightly against each other when the spring is subjected to no load, and a force proportional to the unstretched length of the spring has to be applied before any extension takes place.

When Figure 1 was first considered above, the pillar KF had to be considered as being vertical because the lever HE was regarded as being loaded by the gravitational pull on a mass attached to the lever. When, however, the mass is replaced by a spring connected between two points such as C' and D', there is no necessity for the pillar KF to be vertical, provided the weights of the parts of the lever system are small enough to be ignored. Figure 2 shows in full lines a system similar to that shown in Figure 1 but with the pillar KF in an oblique position. From the foregoing description, it will be clear that, in Figure 2, the lever HE will remain in equilibrium in all positions about the axis H, provided the springs CD and C'D' are appropriately chosen. The system will not be upset if two light links FG and EG are added, as shown in broken lines in Figure 2, these two further links being such that HFGE is a parallelogram linkage. Further, the equilibrium of this linkage will not be upset if the spring C'D' is replaced by a spring having a similar characteristic connected between points C'' and D'' which are any two points on the parallelogram linkage that approach each other as C and D separate and vice-versa. Considering the triangle of forces FC''D'', it is clear that the spring C''D'' exerts a force at D'' which is represented by the vector FC''. This force acts in the same direction as the force that had previously been exerted by the spring C'D' at D' and, provided the rate of the spring C''D'' is correctly chosen, will have the same turning moment about H, in all positions, as the original force at D'. It follows that the parallelogram linkage HFGE will remain in equilibrium throughout all possible changes of shape permitted by the pivots at its corners if springs are connected between pairs of points on its sides such that one pair separates while the other pair approach each other, provided that the rates of the springs are appropriately chosen and, of course, that each of the two springs exerts a force directly proportional to the distance between the two points between which it acts. It also follows that a spring CD can be used to provide a force between any two points such as C' and D' or C'' and D'' that is always directly proportional to the distance between those two points, and the rate of the force can be adjusted by varying the position of C or D along HF or HE respectively. Further, a pair of springs such as CD and C'D' or CD and C''D'' can be used to provide a resultant force, parallel to KF, which is constant in all positions of HE.

It has been assumed that there is no friction in the joints of the linkage but, in practice, there may be a little friction at those joints, and in that case or in the case where the range of movement is small, it is possible to use springs whose characteristics depart slightly from the ideal of exerting a force directly proportional to the total length.

Figure 3:
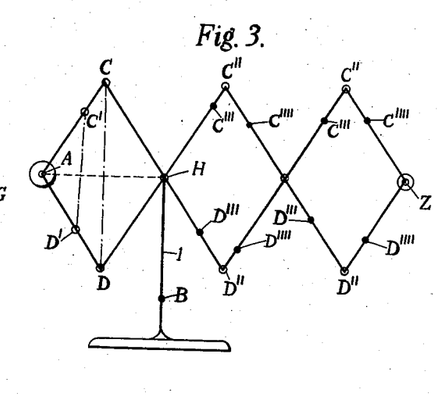
Figure 3 is a diagrammatic side elevation of an equipoised lazy-tongs mechanism.

Figure 3 shows how the principles so far described can be applied to the equipoising of a lazy-tongs mechanism. It is well known that, if a lazy-tongs linkage is pivoted, as shown in Figure 3, at a point H to a support 1, and an object is attached to the lazy-tongs at a point Z, while an appropriately chosen counter-weight is attached to the lazy-tongs at a point A, the lazy-tongs linkage wil remain balanced about the axis H in all angular positions about that axis and in all positions within the range of expansion and contraction of the linkage. Now, if the weight at A is replaced by a spring AB which, throughout its range of extension, always exerts a force which is directly proportional to the distance between the points A and B, the turning moment about H will be the same as that previously provided by the weight, provided that the constant vertical force at A due to the spring, and represented by the vector HB in the triangle of forces HAB, is the same as the gravitational pull on the weight. Thus, the spring provides the exact equivalent of the weight so far as the turning moment about H is concerned. However, the replacement of the weight by the spring introduces a further force acting at A and continuously tending to cause the lazy-tongs linkage to contract, this further force being represented in the triangle of forces AHB by the vector AH and being always directly proportional to the length of that line. This further force must, therefore, be counter-balanced, and such counter-balancing can be provided by an appropriately chosen compensating spring connected between any two points such as C and D or C' and D'. This can be seen by comparing the parallelogram linkage ACHD with the parallelogram linkage FGEH in Figure 2. The force acting at A towards H and proportional to AH is equivalent to the force due to the spring CD in Figure 2, while the force due to the spring connected between the points C and D or C' and D' in Figure 3 is equivalent to the force due to the spring C''D'' in Figure 2. As indicated in Figure 3, the compensating spring need not be applied to the parallelogram ACHD but can be applied with exactly the same effect, at points C''D'' or C'''D''' or C''''D'''', in either of the other parallelograms in the lazy-tongs linkage. Further, a number of compensating springs may be provided, each connected between one of the points C, etc., and one of the points D, etc. Obviously, when more than one compensating spring is used they have to be chosen so that the sum of their effects is such as to balance the force represented by the vector AH in all positions of the lazy-tongs mechanism. If the compensating spring or springs can be accurately made, it is most convenient to design them for attachment between the points C and D, C'' and D'' at pivotal joints in the linkage. If some adjustment is likely to be required, however, it is convenient to arrange for the compensating spring or springs to be connected between points such as C' and D' and for one or more of these points to be adjustable along the line joining the pivotal axes at the ends of its respective link.

When the longitudinal axis of the lazy-tongs linkage is at an angle to the horizontal, there will be a component of force along that axis due to the gravitational pull on the object at Z. This component will, of course, always be balanced by the component at A, along AH, of the vertical force which is represented by the constant vector HB.

Figure 4:
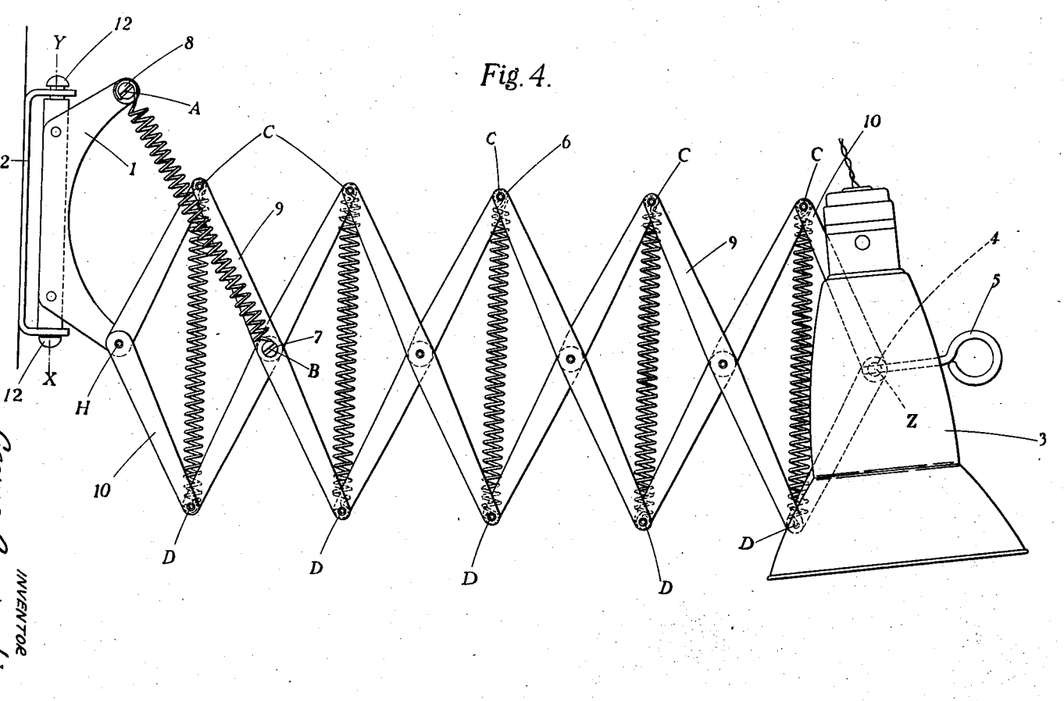
Figure 4 is a side elevation of a lamp embodying lazy-tongs mechanism similar in many respects to that shown in Figure 3.

Figure 4 shows an electric lamp incorporating a lazy-tongs mechanism similar to that shown in Figure 3. The lazy-tongs linkage comprises links 9 and 10, and is pivoted at H to a support 1 which, in turn, is pivoted about an axis XY of a vertical spindle 12 carried by a bracket 2 arranged for attachment to a wall. The links 9 and 10 are all duplicated so that there are, in effect, two lazy-tongs linkages in vertical planes spaced a small distance apart and rigidly connected at their pivotal axes. As Figure 4 is a side elevation only one of the linkages can, of course, be seen. Between each pair of corners C and D in the lazy-tongs mechanism, compensating springs are connected, the springs being located between and common to the two parallel linkages. The main supporting force is provided by two parallel springs connected between a pin 8 on the support 1 and a further pin 7 projecting outwards on each side of the lazy-tongs mechanism. These two springs, which lie one on each side of the lazy-tongs mechanism, are equivalent to the spring AB in Figure 3. The axis of the pin 8 lies in the same vertical plane as the axis H.

At its joint furthest from the support 1, the lazy-tongs mechanism carries a pair of lamps 3. These lamps are parallel to each other and are located one on each side of the lazy-tongs mechanism so that only one can be seen in Figure 4. The lamps are pivotally connected to the lazy-tongs mechanism upon a trunnion 4, the axis Z of which passes through the centres of gravity of the lamps. There is some friction at the pivotal connection between the lazy-tongs mechanism and the lamps, and the latter may be adjusted about the axis of the trunnion 4 through the medium of a handle 5.

Figure 5:
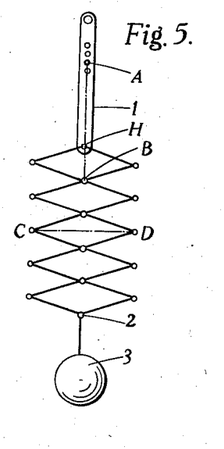
Figure 5 is a diagrammatic side elevation of a further form of equipoised lazy-tongs mechanism.

The equivalence between the construction shown in Figure 4 and that shown diagrammatically in Figure 3 is so obvious that it will be clear that the lamps 3 will remain perfectly balanced in all positions within the range of movement permitted by their supporting mechanism. It will also readily be seen that the arrangement shown diagrammatically in Figure 5 is such that the supported mass 3 will remain equipoised in all positions permitted by the lazy-tongs linkage which connects the mass to a support 1 arranged to extend downwards from a ceiling. In Figure 5 a main supporting spring is connected between a horizontal pin at A on the support and a joint B in the lazy-tongs mechanism. The component of the force due to this spring which causes the lazy-tongs linkage to tend to contract, is compensated by a spring connected between the points C and D. The position of the pin at A is adjustable because the support 1 is formed with a number of holes distributed along its vertical axis into any one of which the pin may be fitted. It is to be noted that the mass 3 is pivoted to the linkage at Z, so that when the linkage is swung about the axis H away from the vertical position, the gravitational force on the mass continues to pass through the axis Z.

Figure 6:
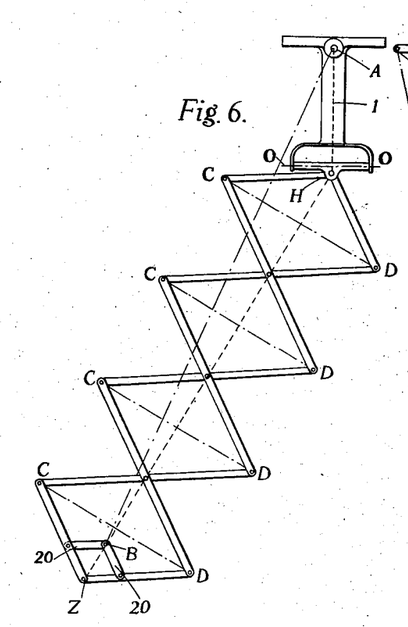
Figure 6 is a side elevation of yet another form of equipoised lazy-tongs mechanism.
Figure 7:
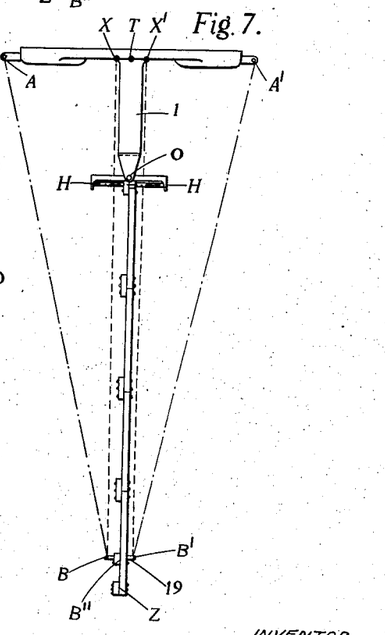
Figure 7 is a front elevation of the mechanism shown in Figure 6.
Figure 8:
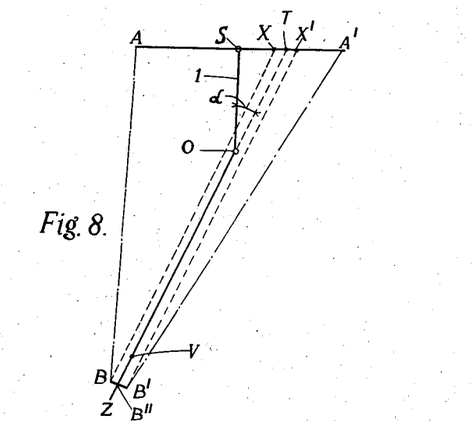
Figure 8 is a diagram used in explaining the mechanism of Figures 6 and 7.

In the arrangement shown in Figures 6, 7 and 8, a lazy-tongs linkage is connected through the medium of a Hooke's joint to a fixed support 1. In practice, a load in the form of a lamp or other object is fixed to the linkage at the joint 2. Two main springs are connected, as shown in Figure 7, so that they diverge from the ends B, B', of a pin 19 to two pins on the support to which they are connected respectively at points A and A'. As in the previous arrangements, each of these springs has the characteristic of exerting a force which is directly proportional to the distance between the two points A and B or A' and B' between which it acts. So that the main springs will not foul the lamp or other object, the pin 19 is not located at the joint Z but at the junction between two subsidiary lazy-tongs links 20.

The Hooke's joint allows the lazy-tongs linkage to swing in its own plane about an axis H and perpendicularly to that plane about an axis O. When the lazy-tongs linkage lies in a vertical plane and is swung about the axis H, the action of the mechanism is the same as that of the mechanisms shown in Figures 3, 4 and 5. Referring to Figure 7, it will be seen that, if the two triangles BXA and B'X'A' are regarded as triangles of forces, the two springs AB and A'B' have the effect of a force $2B''T$ in the plane of the linkage and two equal and opposite horizontal forces XA and X'A' acting at B'', which cancel each other out. In Figure 6, considering the triangle BAH as a triangle of forces, the vector $2B''T$ is represented by the line BA and this force is equivalent to a constant vertical force represented by a vector HA and a force along the longitudinal axis of the lazy-tongs linkage represented by the vector BH. The last-mentioned force is, as in the previous constructions, balanced throughout the range of expansion and contraction of the linkage by springs connected between points C and points D. The constant vertical force represented by the vector HA, also as in the previous constructions, acts at B and in all positions of the linkage provides a turning moment about the axis H which exactly balances the turning moment about that axis due to the load of the lamp or other object and of the linkage.

The mechanism will remain in equilibrium in all positions about the axis O. This can be seen by referring to the diagrammatic Figure 8. Referring to that figure, it will be seen that the lazy-tongs linkage OZ is shown turned about the axis O so that it makes an angle $\alpha$ with the axis of the support 1. If the triangles BXA and B'X'A' are regarded as triangles of forces in respect of the springs BA and B'A', it will be seen that the spring BA exerts at B a horizontal force in one direction represented by the vector XA, while the spring B'A' exerts at B' a horizontal force in the other direction represented by the vector X'A'. The horizontal resultant of these forces is represented by 2TS, which is $2.OS.\tan \alpha$ and the moment of this resultant about O is directly proportional to $OS.OB''.\sin \alpha$. If V is the centre of gravity of the linkage and object at Z, the moment about O due to gravity is directly proportional to $OV.\sin \alpha$. Thus, equilibrium about O depends only on the ratio $$\frac{OS.OB''}{OV}$$

The properties of the lazy-tongs linkage are such that the ratio $$\frac{OB''}{OV}$$

remains constant throughout its range of expansion and contraction, and it will readily be seen that the springs AB and A'B' can be chosen so that the linkage will remain balanced in all positions about the axis O.

When the lazy-tongs linkage is in a position such as that shown in Figure 8, the forces represented by the vectors $2B''T$ and 2TS have a resultant represented by the vector $2B''S$ which shortens as the lazy-tongs linkage is swung about the axis O. However, it will be seen that although this vector shortens, it still provides, when considered in relation to Figure 6, a constant vertical force represented by the vector HA for balancing the load about the axis H, and a force which is directly proportional to the distance between the points B and H that must be balanced in all positions by the forces due to the springs CD.

Figure 9:
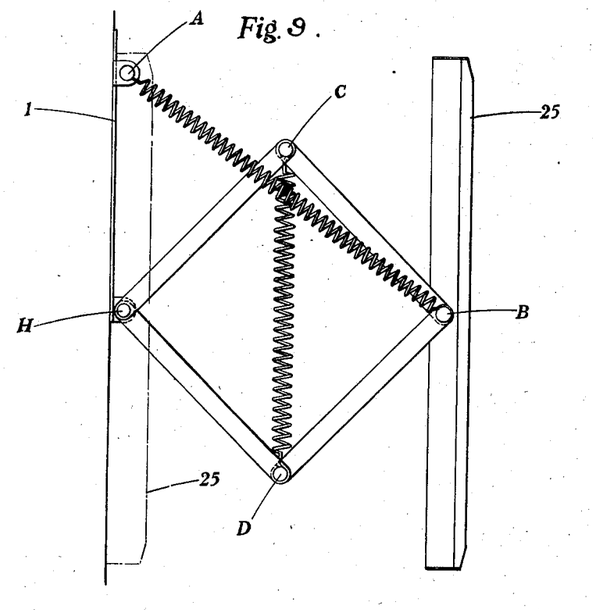
Figure 9 is a side elevation of an equipoised mirror.

Figure 9 shows a mirror 25 mounted at one joint B of a parallelogram linkage which at its opposite joint H is pivoted to a support 1. A spring having the same characteristic as those described in connection with the previous constructions is connected between the joint B and a point A on the support which is vertically above the point H at which the linkage is connected to the support. This spring exactly balances the action of gravity upon the mirror and the linkage in all positions of the latter and the component of force due to the spring AB, acting between the joint B and the opposite joint H, is balanced in all positions by a spring having a similar characteristic and connected between the joints C and D. The parallelogram linkage may, of course, be duplicated so as to give lateral stability to the device, and, if the links are displaced laterally relatively to each other, the linkage can be folded so that the mirror takes up quite an inconspicuous position against the wall to which it is attached, as shown by chain lines.

Figure 10:
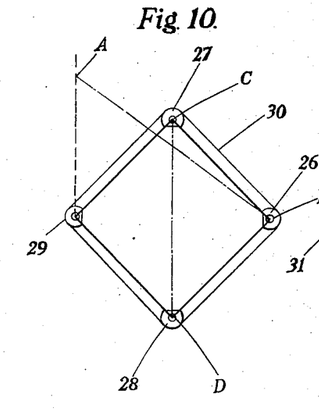
Figure 10 is a diagram showing part of a modified form of the construction shown in Figure 9.

If it is desired that the mirror shall always remain at a constant angle relatively to the support, it may be fixed rigidly to a pulley 26 (Figure 10) to which the outermost links of the parallelogram linkage are pivoted at the axis B. Two further pulleys 27 and 28 are pivoted to the linkage respectively at the pivotal joints C and D. A fourth pulley 29 is fixed rigidly to the support, while the innermost links of the parallelogram linkage can swing relatively to this pulley. A ribbon 30 embraces the four pulleys, and its effect is always to maintain the pulley 26 in a fixed angular position relatively to the axis B.

Figure 11:
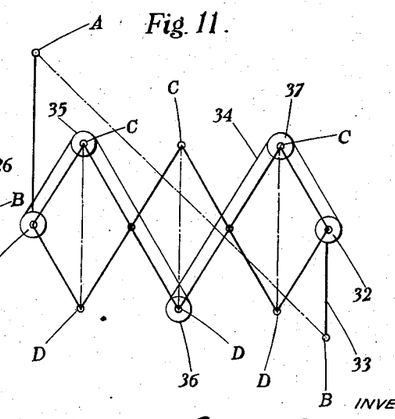
Figure 11 is a diagrammatic side elevation of a further form of equipoised lazy-tongs mechanism.

Figure 11 shows a modification of the arrangement shown in Figure 4. An advantage of the arrangement in Figure 11 over that in Figure 4 is that the vertical distance between the points A and B at which the main springs are connected is increased. A pulley 31 is fixed rigidly to the support while a pulley 32 is fixed rigidly to the lamp or other object to be supported and carries a vertical arm 33 at the lower end of which the point B of attachment for the main springs is located. A ribbon 34 is fixed at one end to the pulley 31, and after passing over rotatable pulleys 35, 36 and 37, arranged as shown, reaches the pulley 32 to which its other end is fixed. This pulley and ribbon arrangement is such that the arm 33 remains vertical in all positions within the range of movement of the linkage.

Figure 12:
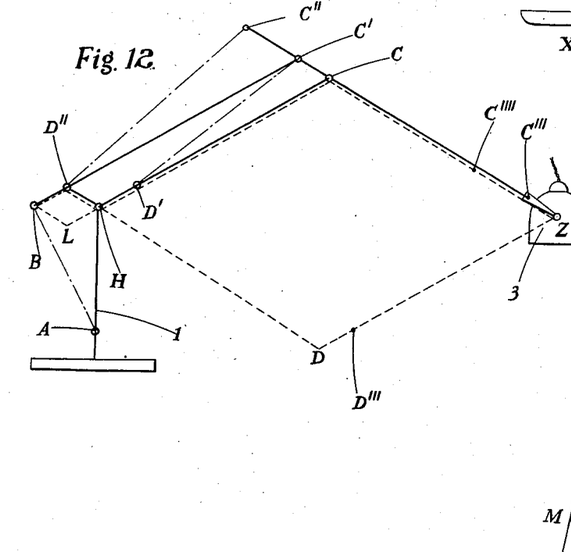
Figure 12 is a diagrammatic side elevation of another equipoised lamp.

Figure 12 shows in full lines an arrangement in which a parallelogram linkage HCC'D'', having an extended side carrying a lamp 3 at Z, is pivoted as a whole about an axis at H to a vertical support 1. A side C'D'' of the linkage is extended to B and a main spring which exerts a force directly proportional to its total length is connected directly at its ends between B and a point A on the support. Considering ABH as a triangle of forces, it will be seen that the spring AB provides a constant vertical force, represented by the vector HA, acting at B. This force serves to balance the parallelogram linkage as a whole about the axis H. The spring AB, however, also provides a force, represented by the vector BH, which, in the absence of an equal and opposite compensating force, would cause the point B to be moved towards the point H. This compensating force may be provided by a tension spring connected so as to act between points such as C' and D' or C'' and D'', the spring being arranged always to exert a force that is directly proportional to the distance between the two points. The analogy between this construction and the previously described constructions will be seen from the fact that the linkage can have the lazy-tongs linkage BLHCZDHD'', shown in broken lines, added to it without upsetting its action, the weights of the links being regarded as so small that they can be ignored. This lazy-tongs linkags is, in fact, the precise equivalent of the linkage shown in full lines and can replace the latter. In such a replacement the compensating tension spring, previously considered in relation to the points C'D' and C''D'', would have to act between the equivalent points C'''D''' or C''''D or similar points.

Figures 12, 13A:
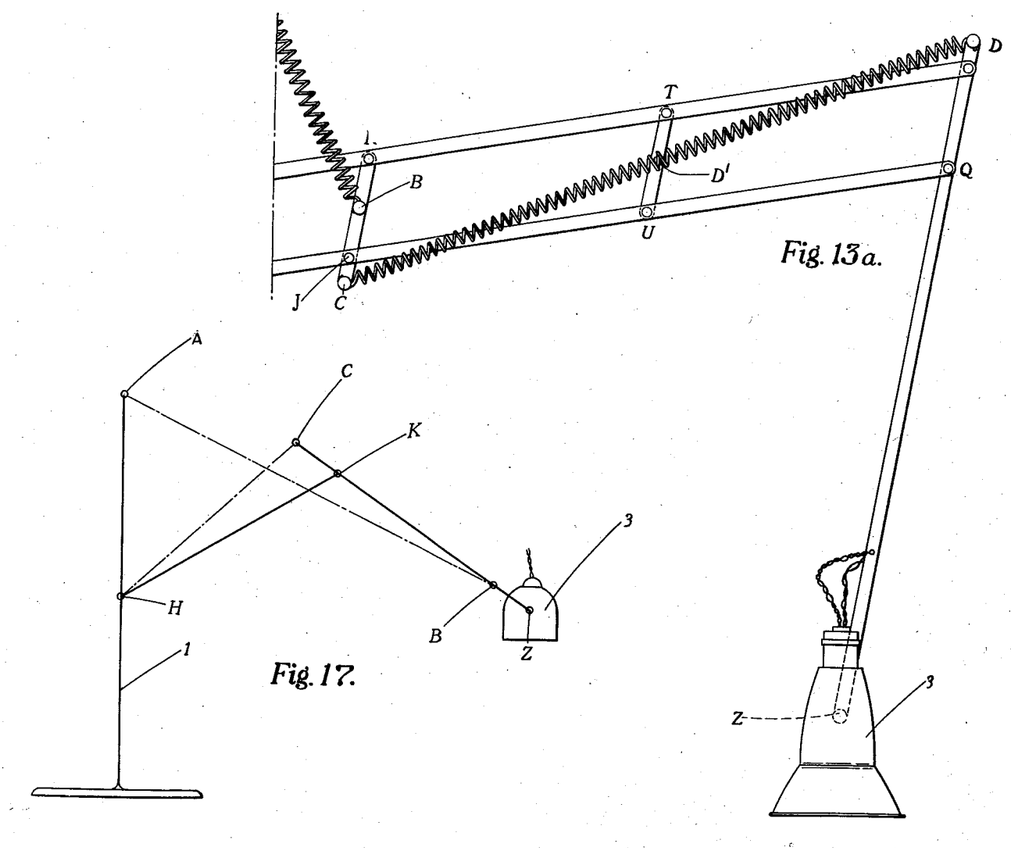
Figures 13 and 13a together are a side elevation of a further equipoised lamp.
Figure 13:
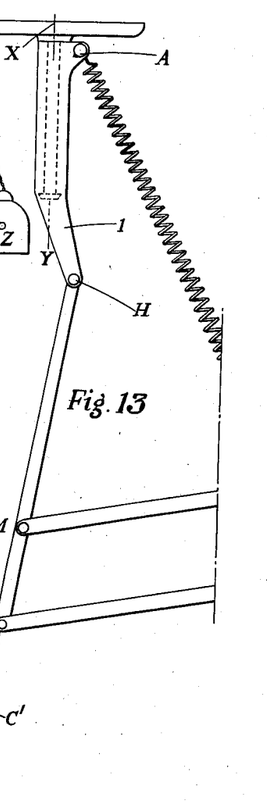

Figures 13—13a show a pendant lamp in which a lamp 3 is carried by a parallelogram linkage pivoted as a whole about an axis H to a support 1. The latter is carried so that it can swing about a vertical axis XY. The mass, comprising the parallelogram linkage and the lamp, is equipoised as a whole about the axis H by a spring AB which has the characteristic of exerting a force proportional to its total length. Considering the triangle of forces ABH, it will be seen that the spring AB exerts at B a constant upward force represented by the vector HA. This upward force balances the downward force due to the weight of the mass. There is also a force represented by the vector BH which has to be balanced by a compensating force within the linkage. This compensating force can be provided by a tension spring connected between the points C and D or between the points C' and D'. In order that the mechanics of the system may be fully appreciated, it may be compared with some of the previously described constructions embodying pure lazy-tongs linkages. Thus, referring to Figure 14, it will be seen that this shows, in full lines, a lazy-tongs linkage pivoted about a horizontal axis H to a vertical support AH corresponding to the support 1 in Figures 13—13a. The lazy-tongs linkage is balanced about the axis H by a spring AB. When the diagonal BH is considered as a vector representing the component of force due to the spring AB that has to be balanced by a compensating spring, it will be appreciated that this component of force may also be represented by the line BZ which, in all positions, is directly proportional to the line BH. A compensating spring is connected between a point C and a point D on an extension of the link ZK. Thus, considering the triangles BKZ and CLD as triangles of forces, it will be seen that the force of the spring CD is equivalent to two forces represented by vectors DL and LC, and the force represented by the vector ZB is equivalent to two forces represented by the vectors ZK and KB. The constant forces represented by DL and ZK can be such as to balance each other, and the forces represented by LC and KB will not deform the linkage if they have the effect of a constant force along the link KS. This will be the case if DK is equal to BC.

Figure 14:
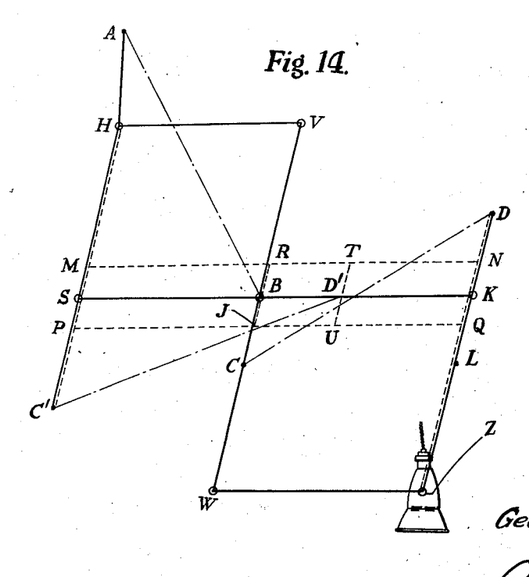
Figure 14 is a diagram used in explaining the construction of Figure 13.

That the force represented by the vector BH can be balanced in all positions by a spring C'D' will be appreciated by comparing Figure 14 with Figure 2. Now, assuming that the weights of the links in Figure 14 are negligible, it is clear that this system will not be affected at all if further links MN, PQ, RJC and TU are inserted. Further, if this transition process is carried one step further by removing the original links HV, VW, WZ, SK, the system will still not be altered from the kinematic and static points of view and a linkage exactly the same as that shown in Figures 13—13a is left.

Figure 15:
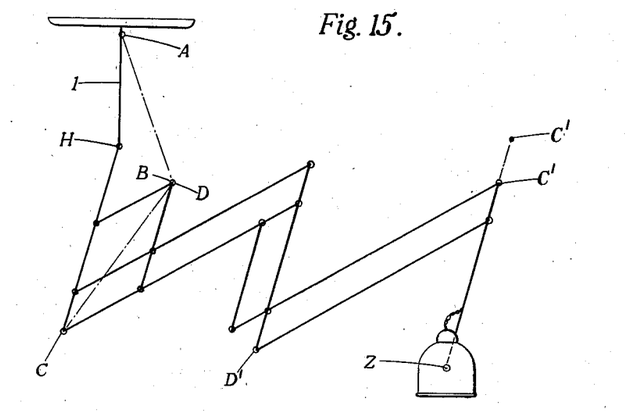
Figure 15 is a diagrammatic side elevation of a further form of equipoised lamp.

The elaborate linkage shown in Figure 15 is pivoted about a horizontal axis H to the lower end of a support 1 and is balanced as a whole about that axis by a spring AB. The unwanted component of force due to the spring AB can be balanced by a spring connected between the points C and D, which is coincident with the point B, or by a spring connected, for example, between either of the points C' and the point D'.

Figure 16:
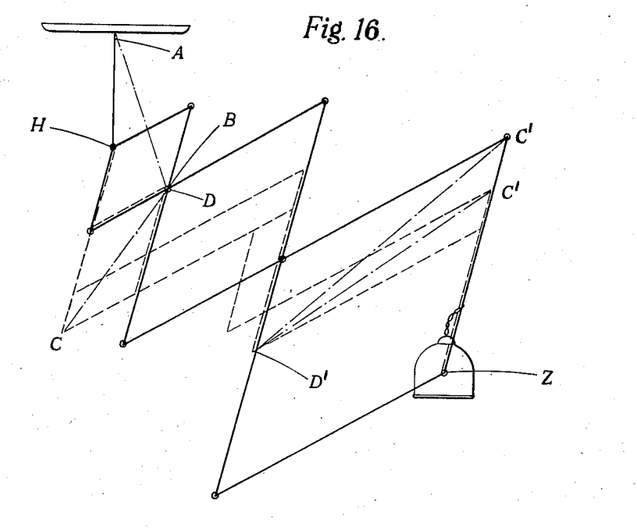
Figure 16 is a diagram used in explaining the construction of Figure 15.

The equivalence between the linkage of Figure 14 and a lazy-tongs linkage is illustrated in Figure 16, in which the lazy-tongs linkage is shown in full lines, the linkage of Figure 15 in broken lines, and the springs in chain lines.

The linkages in all the constructions shown in Figures 3 to 16 may be said to be constituted either by parallelogram or by lazy-tongs linkages. The equivalence between the linkages of Figures 13—13a and 15 and lazy-tongs linkages has already been explained with reference to Figures 14 and 16. The linkage of Figure 12 is also equivalent to a lazy-tongs linkage, as has been explained with reference to the broken lines in that figure.

The equivalent lazy-tongs linkages have been drawn, in Figures 12, 14 and 16, on the assumption that the weights of the linkage mechanisms can be ignored and that the centres of gravity of the entire masses pivoted about the axes H can be regarded as concentrated at the centres of gravity of the lamps. In practice this will not be the case, although the weights of the linkages need not be great, and in each of Figures 12, 14 and 16, it is necessary to design the linkage so that the axis HBZ of the equivalent parallelogram linkage contains the centre of gravity of the entire system pivoted at H. This, of course, is quite easy. For example, in Figure 12, the arrangement would be such that the line BHZ, in passing through the centre of gravity of the entire pivoted mass, would probably intersect the arm carrying the lamp somewhere between the points C''' and C''''.

The arrangement shown in Figure 17 is very simple. The mass 3 to be balanced is carried by a lever CZ pivoted at K to a lever HK which, in turn, is pivoted at H to a support 1. The linkage as a whole is balanced about the axis H by a spring AB which exerts a force which varies directly as its total length throughout its operative range of extension. The spring AB exerts at B a force which, if ABH is regarded as a triangle of forces, is represented by the line HA. Also at B there is a force due to the spring AB represented by the line BH and the action of this force is balanced in all positions by a spring connected between the points H and C. Regarding CHB as a triangle of forces for the spring HC, it will be seen that there is a force at C which is always directly proportional to the distance between the points H and B and which, provided the rate of the spring HC is properly chosen, will balance the turning moment about K due to the spring AB in all positions of the linkage. The force represented by the vector CB in the triangle of forces CHB has no effect on the system because it acts along the lever CZ. The spring AB may be replaced by a number of springs arranged to act between different pairs of points, each pair including a point on the support and a point on the lever CZ. Each of these springs would, of course, have to be arranged to exert a force which varies substantially directly as the distance between the particular pair of points between which it acts and the combined effect of the springs would have to be the same as the effect produced by the single spring AB. The point B is located so that HB passes through the centre of gravity of the entire mass pivoted about the axis H. The spring CH can, of course, also be replaced by a number of springs acting between different pairs of points, each pair including a point on one lever and a point on the other lever.

It may be mentioned that in addition to the linkage of Figures 6, 7 and 8, the linkages in some of the other mechanisms shown in the drawings can be connected to their supports through the medium of universal or Hooke's joints, provided the supporting springs AB are replaced by pairs of springs arranged as in the construction of Figures 6, 7 and 8. For example, the linkages of Figures 13 and 15 can be arranged in this manner.

If, instead of using springs which have the characteristic of exerting a force which varies substantially directly as the total length, it is desired to use the more ordinary kind of spring which exerts a force which varies substantially directly as the extension, it is not difficult to arrange that kind of spring so as to exert a force which varies substantially directly as the distance between the two points between which it acts. Thus, in Figure 3, the spring connected directly between the points C and D, for example, can be replaced by a spring connected at one end to a point located, for example, on the upper left hand link in the lazy tongs linkage and connected at its other end by a ribbon, passing over a small pulley at the joint C, to the point D. Assuming this spring to be an ordinary spring, the arrangement must be such that the distance between the points C and D varies directly as the extension of the spring. The link may be in the form of a tube and the spring may be mounted inside the tube. Any of the springs AB in the various figures may also be replaced by a spring anchored at one end of the support and connected at the other end by a ribbon, passing over a pulley on the support at the point A, to the point B. This kind of arrangement is shown in Figure 8 in the United States Patent No. 2,076,446, where a spring anchored at one point is connected by a ribbon, passing over a pulley, to another point and is such that it exerts a force that is substantially directly proportional to the distance between the pulley and the last mentioned point.

I claim:

1. Equipoising mechanism comprising in combination a support, a lever pivoted to said support, a second lever adapted to carry the mass to be balanced and pivoted to said first-mentioned lever at a point remote from said support, a spring adapted to exert between a point on said support and a point on said second lever a force which varies substantially directly as the distance between said two last-mentioned points, and a second spring organised to exert between a point on said first lever and a point on said second lever a force which varies substantially as the distance between those points.

2. Equipoising mechanism comprising in combination a support, a collapsible linkage, a universal joint device interposed between said support and said linkage, a pair of springs connected to said linkage, at points on either side of the plane containing said linkage, and diverging respectively on either side of said linkage to said support to which said pair of springs are also connected and a further spring connected between two points on said linkage, each of said springs being organised to exert between the two points between which it acts a force which varies substantially directly as the distance between those two points.

3. Equipoising mechanism comprising in combination a support, a lazy-tongs linkage adapted to carry the mass to be balanced, a universal joint connecting said support and said lazy-tongs linkage, springs mounted on each side of the plane containing said linkage and connecting the latter with said support, a further spring connected between two points on said linkage, each spring being arranged to exert a force which varies substantially directly as the distance between the two points between which it acts, and the springs being disposed so as to enable said linkage to remain in equilibrium in all positions about the axes of said universal joint and throughout its range of expansion and contraction.

4. In equipoising mechanism, in combination, a support, a lever system pivoted to swing as a whole in a vertical plane about a horizontal axis on said support, said system comprising an articulated linkage and a tension spring organized to act between two points on said linkage and to contract as said points approach each other while two further points on said linkage move away from each other, one of said further points being located on said axis, a mass connected to said linkage at the other of said further points, and a second tension spring organised to act between a point on said support and a point on said linkage to counteract both said first-mentioned spring and the turning moment about said axis due to the weight of said mass, said axis and said point on said support being located one above the other and each of said springs having the characteristic of exerting a force which is always substantially directly proportional to the distance between the two points between which it acts.

5. In equipoising mechanism, in combination, a support, a collapsible linkage, serving as a carrier for the mass to be balanced, pivoted to swing in a vertical plane about a horizontal axis on said support, a tension spring organised to exert between a point on said linkage and a point on said support a force which is substantially directly proportional to the distance between the said points in all positions thereof said axis and said point on said support being located one above the other and said linkage being articulated between said first-mentioned point and said axis to enable said point on said linkage to be moved towards said axis while said spring contracts, and a second tension spring organised to exert between two further points on said linkage a force which is substantially directly proportional to the distance between said further points in all positions thereof, said further points being located so that they separate and cause said second spring to extend in the aforesaid movement.

6. Equipoising mechanism comprising, in combination, a support, a mass to be maintained in equilibrium in all positions within a predetermined range of movement relatively to said support, a collapsible linkage connecting said support with said mass and pivoted about a horizontal axis on said support to permit said mass and said linkage to swing in a vertical plane relatively to said support, said linkage being articulated to permit said mass to move towards and away from said axis, spring means organised to act between points, each remote from said axis, respectively located on said support and said linkage thereby providing a force acting towards said axis and a turning moment about said axis counteracting the weight of said mass, and second spring means organised to act between two points on said linkage to counteract said force.

7. Equipoising mechanism comprising, in combination, a support, a linkage pivotally mounted to swing in a vertical plane as a whole about a horizontal axis on said support, a tension spring connected to exert between two points on said linkage a force which varies substantially directly as the distance between said two points, said spring tending to cause a third point on said linkage to move away from said axis and a further spring operative to exert between a point on said support in a substantially vertical plane containing said axis and said third point a force which is always substantially directly proportional to the distance between those two points and on the one hand balances said linkage about said axis and on the other hand counteracts said tendency.

8. In an equipoising mechanism as set forth in claim 7, in which the linkage is in the form of a parallelogram.

9. In an equipoising mechanism as set forth in claim 7, in which the linkage is in the form of a lazy tong mechanism.

10. In an equipoising mechanism as set forth in claim 7, in which the linkage comprises two levers, one pivoted to said support at one end and to the other lever intermediate its ends at its other end.

11. In an equipoising mechanism as set forth in claim 7, in which the linkage comprises two levers, one pivoted to said support at one end and to the other lever intermediate its ends at its other end and including the member to be equipoised supported from one end on the second lever.

12. Equipoising mechanism comprising, in combination, a support, a parallelogram linkage pivotally mounted to swing as a whole about a horizontal axis on said support and at one corner of said linkage; a tension spring connected to exert between two points on said linkage a force which varies substantially directly as the distance between said two points, said spring tending to cause the corner of said linkage opposite said first-mentioned corner to move away from said axis; and a further spring operative to exert, between a point on said support, in a substantially vertical plane containing said axis, and said second-mentioned corner, a force which is always substantially directly proportional to the distance between said point on said support and said second-mentioned corner, said second-mentioned spring serving on the one hand to balance said linkage about said axis and on the other hand to counteract said tendency.

GEORGE CARWARDINE.